(12) United States Patent
Pignataro et al.

(10) Patent No.: US 10,417,599 B2
(45) Date of Patent: Sep. 17, 2019

(54) TIME AND MOTION DATA FUSION FOR HIGH FIDELITY DATA SETS

(71) Applicant: Cisco Technology, Inc., San Jose, CA (US)

(72) Inventors: Carlos M. Pignataro, Raleigh, NC (US); James D. Stanley, III, Austin, TX (US); Rajesh Vargheese, Austin, TX (US); Ammar Rayes, San Ramon, CA (US); David Prantl, Hamburg (DE); Hazim Hashim Dahir, Raleigh, NC (US); Gonzalo A. Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1023 days.

(21) Appl. No.: 14/845,777

(22) Filed: Sep. 4, 2015

(65) Prior Publication Data

US 2017/0068913 A1    Mar. 9, 2017

(51) Int. Cl.
*G06Q 10/00* (2012.01)
*G06Q 10/06* (2012.01)

(52) U.S. Cl.
CPC ....... *G06Q 10/067* (2013.01); *G06Q 10/0633* (2013.01); *G06Q 10/06315* (2013.01); *Y02P 90/82* (2015.11)

(58) Field of Classification Search
CPC .... G06Q 10/06; G06Q 10/20; G06Q 10/0633; G06Q 10/067; G06Q 10/06315; H04W 4/029

See application file for complete search history.

(56) References Cited

U.S. PATENT DOCUMENTS

| 7,180,420 B2 | 2/2007 | Maurer | |
| 7,518,511 B1* | 4/2009 | Panja | G06Q 10/08 |
| | | | 340/539.13 |
| 2007/0090180 A1* | 4/2007 | Griffis | G06Q 10/06 |
| | | | 235/376 |
| 2008/0086509 A1* | 4/2008 | Wallace | G06F 16/285 |
| 2008/0317021 A1* | 12/2008 | Ives | H04L 12/10 |
| | | | 370/389 |

(Continued)

OTHER PUBLICATIONS

Sankaranarayanan, A., Veeraraghavan, A., & Chellappa, R. (2008). Object Detection, Tracking and Recognition for Multiple Smart Cameras. Proceedings of the IEEE, 96(10), 1606-1624. (Year: 2008).*

*Primary Examiner* — William S Brockington, III
(74) *Attorney, Agent, or Firm* — Edell, Shapiro & Finnan, LLC (57) ABSTRACT

A plurality of data sets are compiled in a memory. A first data set comprises a location mapping of an item of interest within a predetermined environment, and a second set comprises energy usage data within the predetermined environment. The first data set is correlated, via a processor, with the second data set to locate a subset of energy usage data in the second data set associated with the item of interest. A third data set is generated by combining the first data set with the subset of energy usage data in the second data set to increase an accuracy of the location mapping of the item of interest based upon the subset of energy usage data. The third data set is applied to a computing resource.

20 Claims, 10 Drawing Sheets

(56) References Cited

U.S. PATENT DOCUMENTS

| | | | |
|---|---|---|---|
| 2011/0050878 A1* | 3/2011 | Wells | H04N 7/181 |
| | | | 348/86 |
| 2011/0125539 A1* | 5/2011 | Bollapragada | G06Q 10/0631 |
| | | | 705/7.12 |
| 2011/0149934 A1 | 6/2011 | Dickson, Jr. et al. | |
| 2012/0271472 A1 | 10/2012 | Brunner et al. | |
| 2013/0288713 A1 | 10/2013 | Fu et al. | |
| 2014/0019319 A1 | 1/2014 | Derby et al. | |
| 2015/0323948 A1* | 11/2015 | Jeong | G05B 15/02 |
| | | | 700/291 |
| 2015/0327010 A1* | 11/2015 | Gottschalk | G06F 17/50 |
| | | | 455/456.1 |
| 2016/0284073 A1* | 9/2016 | Michalscheck | G06T 7/001 |

* cited by examiner

TIME AND MOTION DATA FUSION FOR HIGH FIDELITY DATA SETS

TECHNICAL FIELD

The present disclosure relates to the acquisition and processing of multiple time and motion data sets.

BACKGROUND

Time and motion analytics are the evaluation of work systems involving the movement of people, data, and equipment over time. Time and motion use cases were originally performed by filming and analyzing, for example, the motion of bricklayers and the work habits of clerical employees. As technology has progressed, the sophistication and complexity of time and motion studies have expanded into numerous industries.

Time and motion analyses may be used to create powerful data sets that provide a deeper and more complete understanding of movement and work systems. Yet, when these data sets are created, they are normally created for narrowly focused use cases.

DESCRIPTION OF EXAMPLE EMBODIMENTS

Overview

A plurality of data sets are compiled in a memory. A first data set comprises a location mapping of an item of interest within a predetermined environment, and a second data set comprises energy usage data within the predetermined environment. The first data set is correlated, via a processor, with the second data set to locate a subset of energy usage data in the second data set associated with the item of interest. A third data set is generated by combining the first data set with the subset of energy usage data in the second data set to increase an accuracy of the location mapping of the item of interest based upon the subset of energy usage data. The third data set is applied to a computing resource.

Example Embodiments

Figure 1:
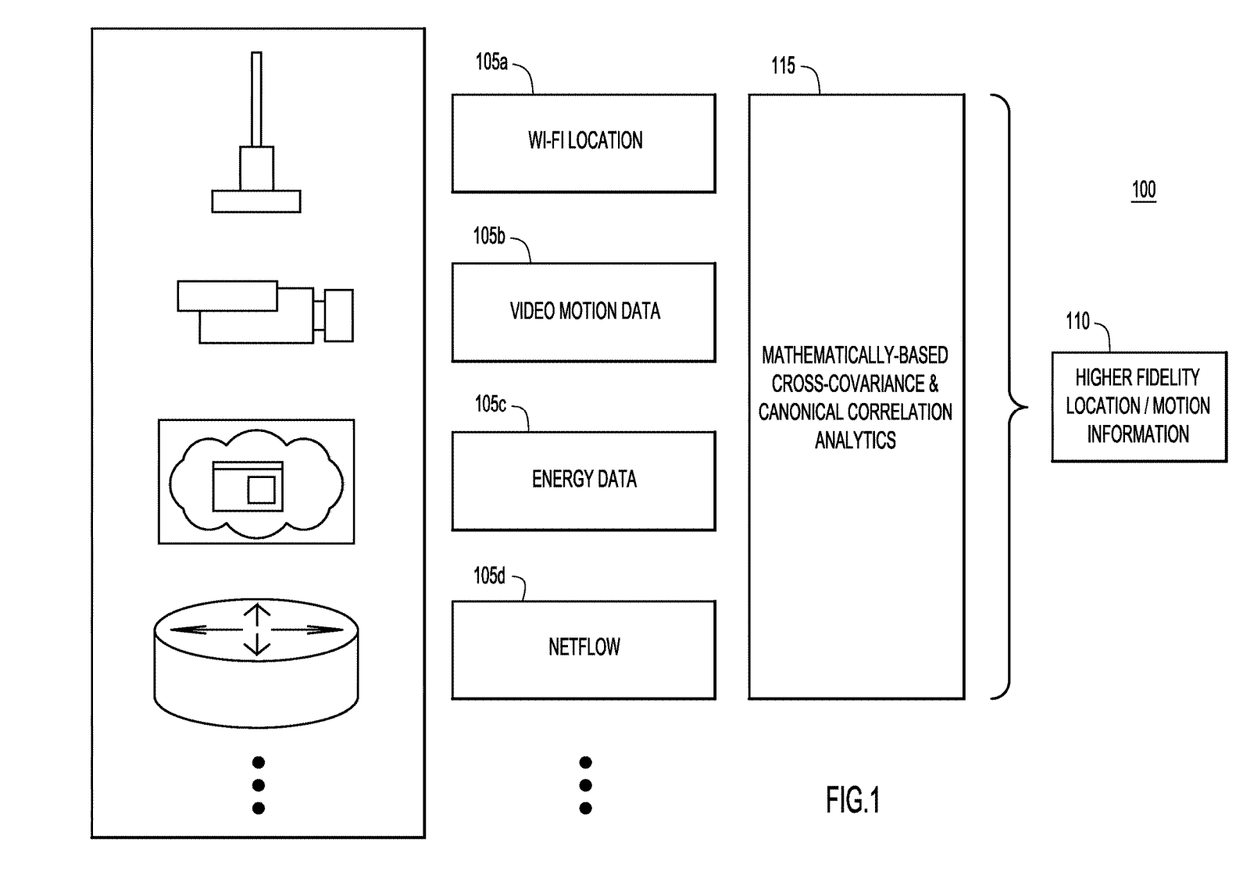
FIG. 1 is a block diagram illustrating the fusion of time and motion data to generate high fidelity data sets, according to an example embodiment.

With reference made to FIG. 1, depicted therein is a block diagram 100 illustrating how multiple data sources 105a-d may be used to increase the fidelity of time and motion data 110 through analytics and optimized novel mathematical techniques 115, such as pattern motion analysis, relevancy scoring, and other techniques that will be described herein. Specifically, the analytics 115 fuse (i.e., combine, correlate, etc.) and transform data sets 105a-d from disparate network services (such as video data 105b, wireless network (e.g., Wi-Fi®) data 105a, energy consumption 105c data, Cisco NetFlow™ data 105d, and others) to derive data that may be used to supplement and/or fill in gaps in time and motion data. In other words, through the combination and analysis of multiple data sources 105a-d, the gaps in each of these data sources may be eliminated. Related techniques often fill these data gaps with assumptions, models, and unverifiable data guesses and extrapolations. The techniques described herein may more accurately fill these gaps, providing higher fidelity location and motion information that can be applied predictably for time and motion analysis and forecasting.

For example, Wi-Fi location data 105a and video data 105b are two possible and different data sets that may be used to track motion. Both Wi-Fi and video data capture and report a form of location data, but do so in different ways. The combining of x-y coordinates from each of video data 105b and Wi-Fi location data 105a (i.e., blending/overlaying the coordinate data) can be used to obtain a higher resolution x-y coordinate data set. This combined data set may also be blended with an appropriately devised mathematical approach and/or z-coordinate information, to produce improved higher fidelity location information (with spatial awareness) and yield a derived motion data set for improved physical location evaluation, management, and servicing. Particularly applicable to the present disclosure may be the combination of energy consumption data 105c with other data sources in order to improve the fidelity of location data. Furthermore, the higher fidelity time and motion data sets 110 may be applied to a variety of verticals and Internet of Things (IoT) and Internet of Everything (IoE) use-cases to measure against business process data sets, such as production (manufacturing, oil, etc.,) data, safety data, engineering design data, and others.

Once generated, the higher fidelity data sets may be applied to computing resources, such as adaptive Computer Aided Design (CAD) mappings of locations and resource reservation systems. The higher fidelity data sets may also be used to predict future movement and/or future locations of items of interest.

The techniques described herein are different from the use of blanketing sensors and/or active radio frequency identification (RFID) alone. Active RFID suffers from the expense of the sensors and a lack of physical adaptability in complex environments with a high degree of signal interference. Video tracking data sources also suffer from high expense when using a blanket sensor approach, and video data can experience gaps in coverage and gaps in dimensionality due to the two-dimensional nature of the data. By combining additional data sources, such as NetFlow data 105*d* and energy consumption data 105*c* to video data 105*b* and RFID data, the gaps in the video and RFID data may be filled, and physical changes within the dark areas of the video and RFID data may be accurately modeled.

Figure 2:
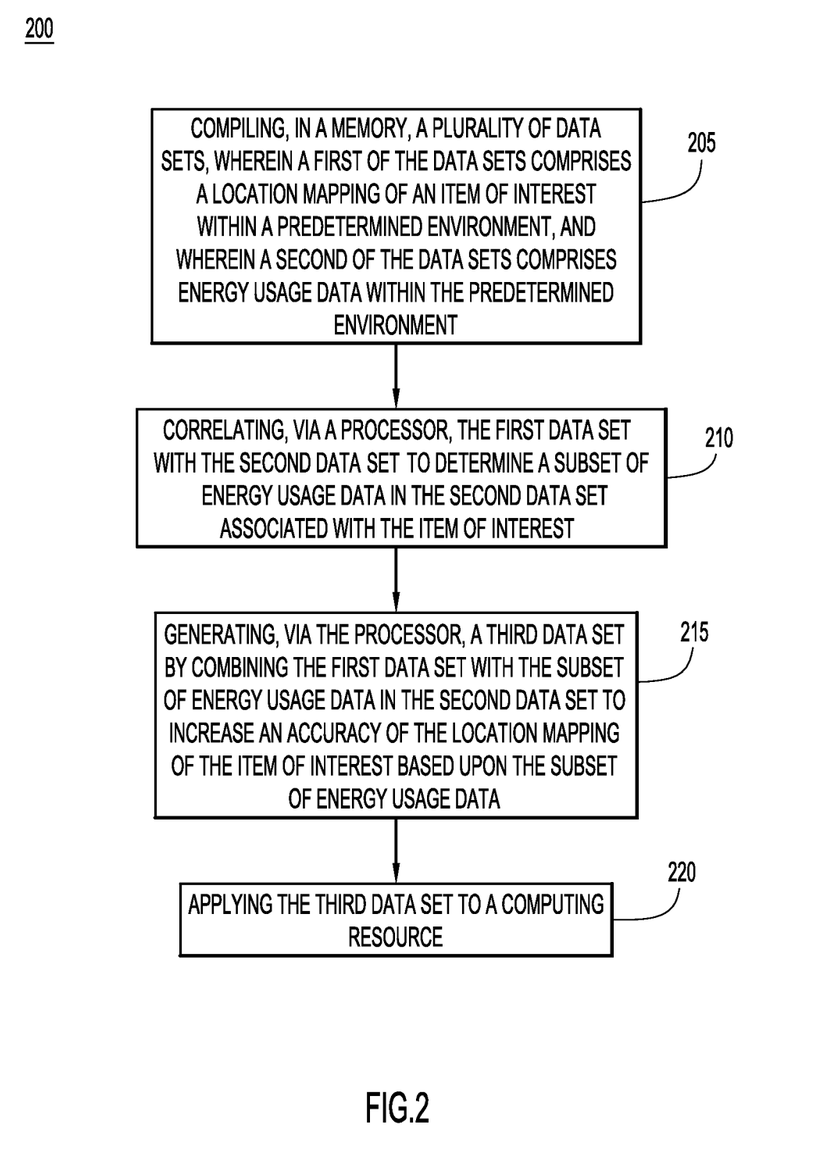
FIG. 2 is a flowchart illustrating a process for combining time and motion data, including energy data, to generate high fidelity data sets, according to an example embodiment.

With reference now made to FIG. 2, depicted therein is a flowchart 200 illustrating a process for increasing the fidelity of time and motion data using a plurality of data sources. The process begins in operation 205 where a plurality of data sets is compiled in a memory. These data sets may be the one or more of the Wi-Fi 105*a*, video 105*b* energy 105*c* or NetFlow 105*d* data sets illustrated in FIG. 1. According to the example embodiment of FIG. 2, a first of the plurality of data sets may be a location mapping of an item of interest. This location mapping may be derived from Wi-Fi data, video data, RFID tag data, NetFlow data, or badge swipe data, among others. A second of the plurality of data sets comprises energy usage data (i.e., energy data 105*c* from FIG. 1), though other example embodiments may combine other data sets that do not include energy usage data. Furthermore, as will be described in more detail below, the item of interest may comprise one or more employees, one or more customers, one or more pieces of equipment (e.g., manufacturing equipment), or one or more products being manufactured, among others.

In operation 210, the first data set is correlated with the second data set to determine a subset of the energy usage data in the second data set that is associated with the item of interest. This correlating may also determine which portions of the first data set comprises the location mapping for the item of interest. In operation 215, a third data set is generated, by the processor, by combining the first data set and the subset of the second data set to increase an accuracy of the spatial mapping of the item of interest.

The correlating and combining of the data sources that takes place in operations 210 and 215 allows for higher fidelity data sets to be formed, i.e., the third data set generated in operation 215. The key to obtaining a higher fidelity data set from data sources involves understanding the nature of the data from each source and the limitations of each of those different data sets. For example, video data takes into account physical space that Wi-Fi location data does not address. Wi-Fi location data, on the other hand, takes into account network node attributes, signal patterns, and gaps that video data does not address. NetFlow data differs from video and Wi-Fi data as it includes inferred packet time interval-based flow data and other relevant statistical information. These data sources are independent. In order to improve the accuracy of these data sources and produce increased fidelity from these disparate data sources, correlating and combining operations 210 and 215, respectively, augment and enhance each other through a combining effect. The higher fidelity data sets can be scored based on the location, flows, and real-time calculations of possible next coordinate confidence scores.

For example, the correlation and combination of the data sets of operations 210 and 215, may take any of the following forms.

Query Spike Processing—A spatial query that spikes an x/y coordinate across the data sets may be used to generate a derived data set that then feeds into the production of a map of the space in which an item of interest is located.

Cross-Covariance & Canonical Correlation—Signal processing may be performed for investigating the relationships between two sets of variables across the data sets. Cross-covariance and canonical correlation looks for the relationships between the time and motion data in the data sets.

Multilinear Subspace Learning & Local Optimum Analysis—Vectorization, dimensional reduction, and locating low-dimensional changes due to motion and time factors in data sets may be performed. This processing may improve optimization within near neighboring space configurations and motion movements/patterns. Multilinear subspace learning and local optimum analysis may also look for vector changes in the high dimensions of the space under time and motion analysis, and focus on lightweight and rapid analysis. The lightweight and rapid analysis may retain as much information as possible to enable the space element changes to be used for scoring, state confidence, and user interface computation-based visual dynamic CAD/spatial mapping representations of a constantly changing physical environment.

Predictive Outcome and Anticipatory Movement Analysis—A probability of a trend of directional triangulation or path projection is determined based on mixing motion data from multiple sources with historical data from the same locations. Graphing may be used to eliminate noise factors and to mathematically map relationships. Motion-based time interval and spatial adaptive algorithms may be used to triangulate the x/y/z coordinate directions, and cross-interrogated with motion vectors from other data sources. This cross-interrogation allows for increased fidelity of the data set outputs through mathematical rather then modeled/assumption-based techniques. Z-dimensionality modeling and mathematical calculations may be implemented by understanding the data set graphing relationships, identifying the gaps in the data sets, and mathematically calculating or ingesting z-coordinate information to improve dimensionality. In some example embodiments, z-coordinate data may be improved through signal analysis and abstraction of the interferences with verification of those interferences (e.g., as an airplane component passes space A, interfering with the Wi-Fi signal in space A, the video and fiber connected network connections would feed additional data to the analytics engines to produce the scored physical change representation options for human/expert verification).

Finally, in operation 220, the third data set is applied to a computing resource. For example, the computing resource may be a CAD system that provides an adaptive mapping of a location of interest, a reservation system that will reserve resources in response to a change in the location of the item of interest, a user interface that displays the higher fidelity data to a user, or a system that uses the higher fidelity data to make further predictions, such as predictions regarding the future location and/or movement of the item of interest.

Figure 3:
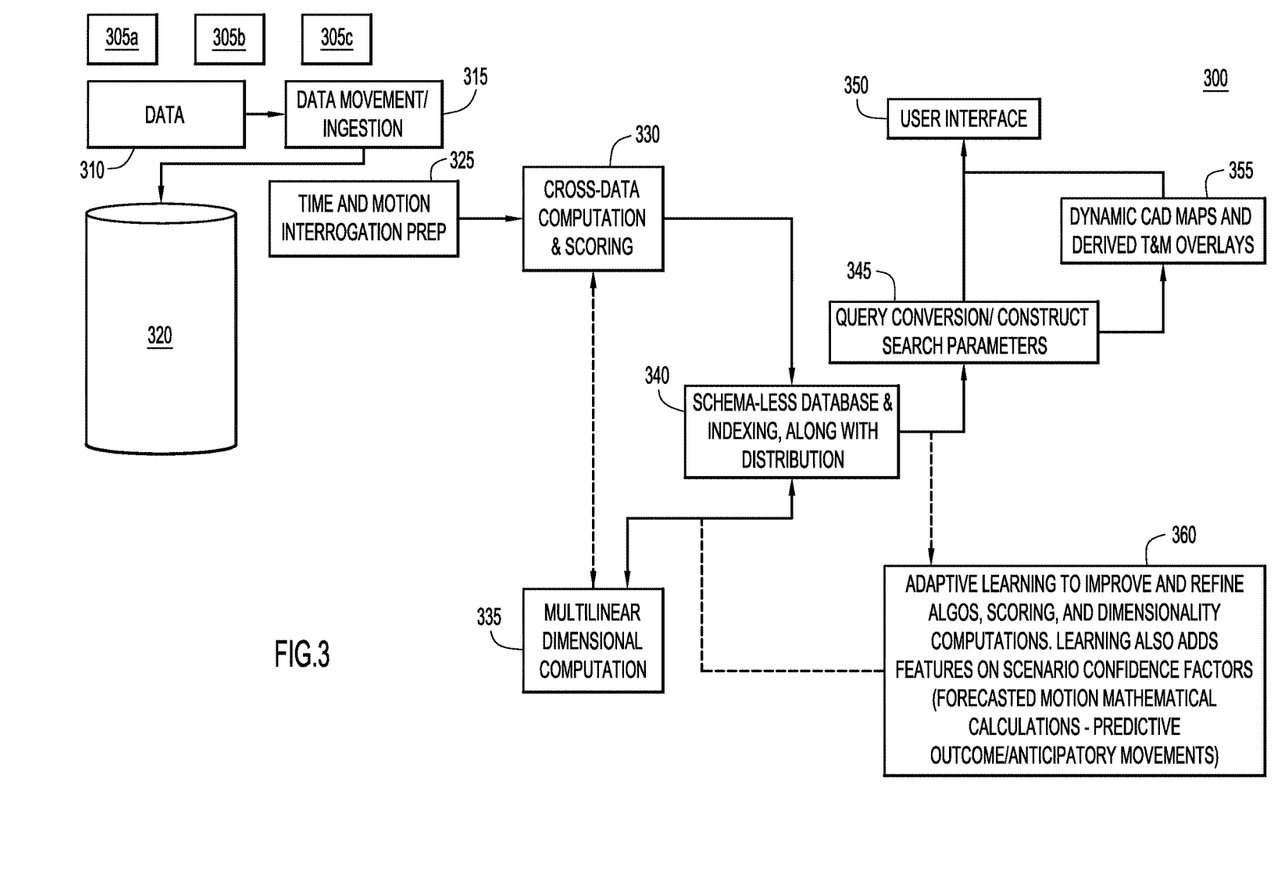
FIG. 3 is a flowchart illustrating a detailed process flow for time and motion data, including energy data, to generate high fidelity data sets, according to an example embodiment.
Figure 7:
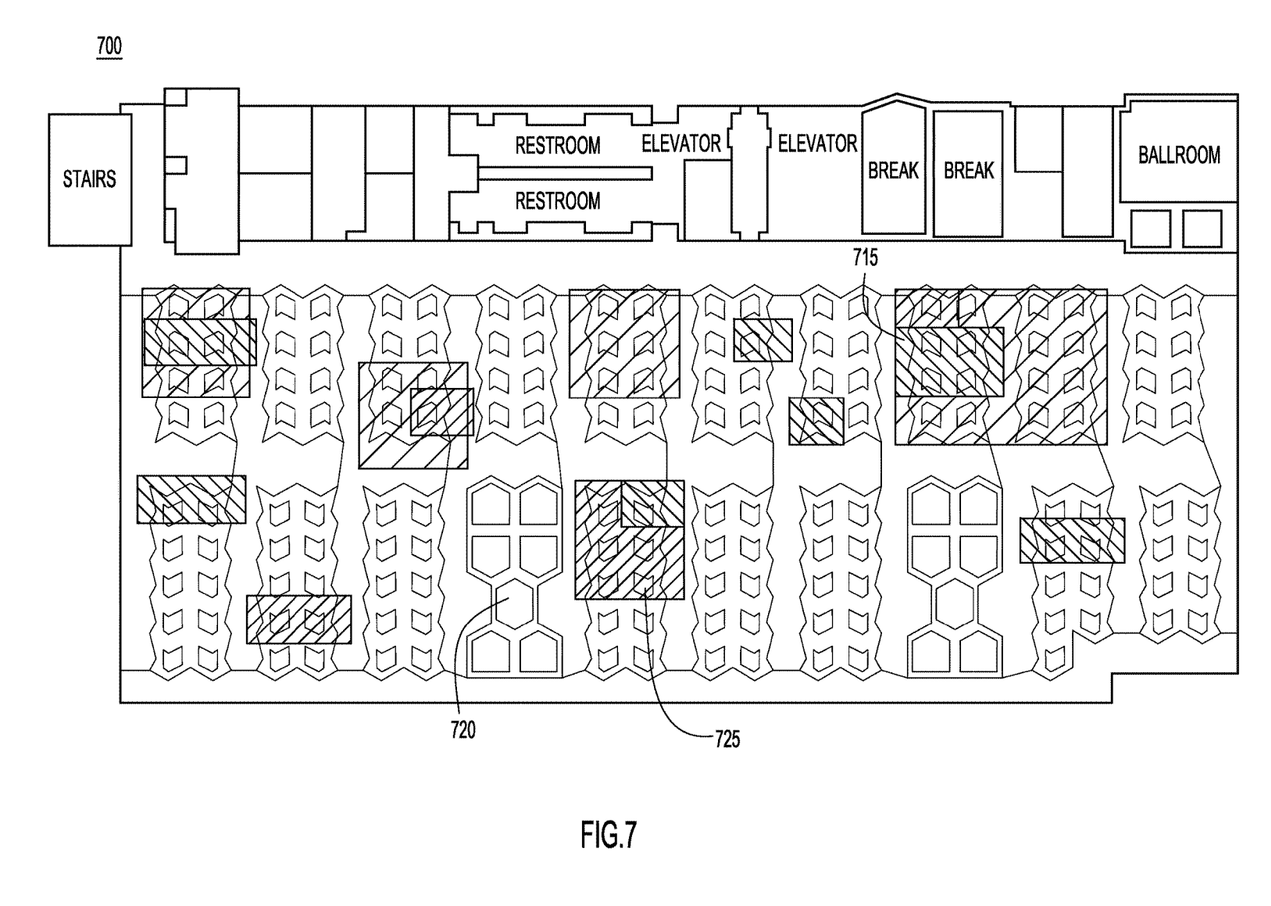
FIG. 7 is an illustration of an office environment mapping overlaid with energy consumption data that is used to analyze presence, according to an example embodiment.

With reference now made to FIG. 3, depicted therein is a flowchart 300, illustrating end-to-end logic for a process like that of flowchart 200 of FIG. 2 when applied to motion, location and/or energy consumption data obtained from multiple network sources. According to the embodiment of FIG. 3, the data is processed with software-based analytics that have been optimized for time and motion pattern analysis and computational algorithms that yield confidence and effectiveness motion scoring. The enhanced high fidelity motion information that is generated from process 300 is presented to the user in a variety of consumable ways, including dynamic CAD maps and derived time and motion overlays (an example of which is illustrated in FIG. 7, below).

The process of flowchart 300 begins when data is acquired from data sources 305a-c in operation 310. In flowchart 300, the data sources include Wi-Fi data from Wi-Fi data source 305a, video motion data from video source 305b, and energy consumption data from energy data source 305c. A preliminary processing of the data takes place at operation 315 in order to ingest and move data from the data sources 305a-c to a repository 320. Once in repository 320, an initial time and motion interrogation and preparation is performed on the data in operation 325. This initial interrogation and preparation performs an initial time and motion analysis on the data streams received from data sources 305a-c. For example, the initial preparation may inspect the data streams to determine which portions of the streams are relevant. The relevant portions of the streams may be accepted, while non-relevant portions may be rejected and/or deleted. The data may also be transformed (e.g., formatted, reorganized, etc.) in order for additional processing, such as a query spike analyses, to be carried out in later operations of process 300.

At operation 330, cross-data computation and scoring is performed on the data received from data sources 305a-c. Operation 330 may include unique decompositions of math-based pattern analysis for time and motion covariance and correlations. Operation 300 may also produce confidence and effective motion scoring. For example, when two or more data sources are combined, the combination may not just be used to produce a higher fidelity data set. The processing of operation 330 may also include calculating a confidence level for the time and motion data processed in 330. If only one of the three data sets received from data sources 305a-c indicates that an item of interested was located at a particular location, the confidence level calculated for that data point may be less than if two or more of the data streams indicate the same location.

In operation 335, multilinear dimensional computations are performed on the data received from data sources 305a-c. These computations analyze and derive dimensionality of key temporal, spatial and motion state aspects of the data streams. Furthermore, the dimensions are verified or estimated to fill in the spatial location information in the data streams. In other words, the data streams from data sources 305a-c are processed and combined to fill in the holes in the different data sources.

The processing of operations 330 and 335 may be carried out by distributed in-network-node computational software, following hive-like rules. This software may be updated or adapted to higher order situations and support processing in distributed computation control points, such as a local area network, a wide area network or in a central compute cloud. Software calculations may be pushed to edge devices as appropriate, and the calculations may return processing-intensive modeled data or dimensional data back to higher computational capacity elements across the network. Failover is performed through hive-like rules maintained in distributed memory, allowing for motion calculations during disconnected and discontinuity events in harsh environments or situations.

The results of operations 330 and 335 can be stored in a database, such as a schema-less database, in operation 340. The database may be indexed and distributed to users. In operation 345, queries may be constructed or converted based on user specified or automatically generated search criteria in order to provide the data to processing resources.

For example, the time and motion data generated in operations 330 and 335 may be queried for display to a user as illustrated in operation 350, and as will be described in greater detail with reference to FIG. 6-8. The queries and search parameters established in operation 345 may also be used to extract data that will be used to update dynamic CAD maps and derive time and motion overlays, as will be described in more detail with reference to FIG. 4. The results of operations 330 and 335 may be used for real-time policy modulation in areas like software defined provisioning of network services, and/or business-based physical workflow and safety services. In other words, the techniques described herein provide a software-based technique for producing time and motion data sets, for visualizing the spatial representations of the changed physical environment, and scoring methodologies for real time or forecasted motion signals/flows.

At the same time that the data is being processed for display and use by the users in operations 345-355, operation 360 may be utilized to provide adaptive learning for the multilinear computations that take place in operation 335. Specifically, operation 360 may serve as a feedback loop, using the results of operations 330 and 335 to improve and refine these operations. Specifically, operation 360 provides adaptive learning to improve and refine the algorithms used in the scoring and dimensionality computations of operations 330 and 335. Operation 360 can also add features and scenario confidence factors, such as forecasted motion calculations, predictive outcome calculations, and anticipatory movement calculations, to the outcomes of operations 330 and 335.

Figure 4:
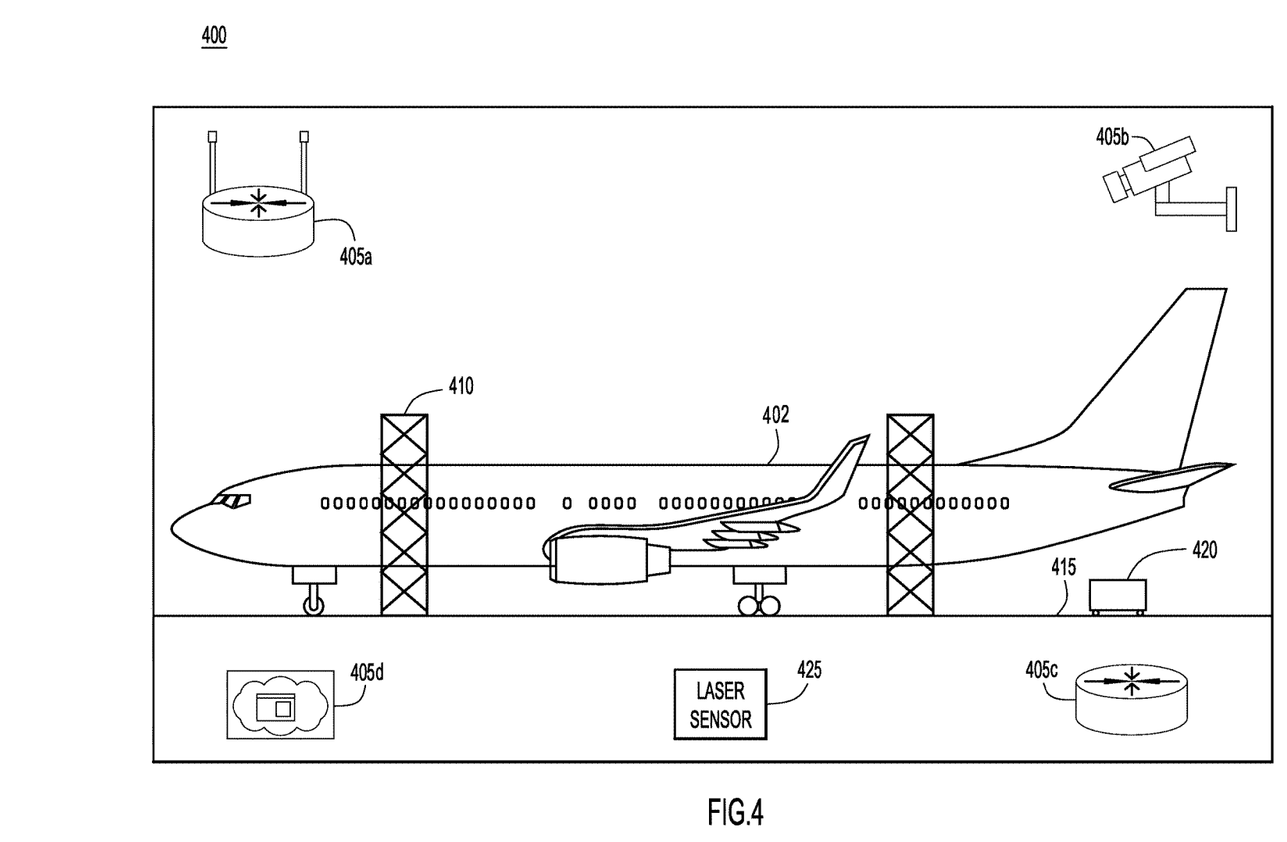
FIG. 4 is an illustration of a manufacturing floor configured to generate time and motion data, including energy data, for fusion into high fidelity data sets, according to an example embodiment.

With reference now made to FIG. 4, depicted therein is a complex manufacturing environment 400, specifically an aircraft 402 manufacturing and servicing plant, to which the techniques described herein may be applied. Due to the construction of the plant, there are limitations (i.e., holes) in both Wi-Fi signal coverage provided by Wi-Fi data source 405a and video coverage provided by video data source 405b. These limitations may be due to the layout, physical structure and sheer expansiveness of the facility, the movement of signal-interfering structures and/or large components blocking views, as well as the sophisticated workflows that take place in such complex environments.

For example, modular assembly structures 410 and moving assembly line 415 produce multiple disruptions to Wi-Fi signal and gaps in Wi-Fi coverage. Modular assembly structures 410 may also cause gaps in the video coverage provided by video data source 405b. Accordingly, when items of interest, such as manufacturing equipment, employees and/or items being manufactured are obscured by modular assembly structures 410, they will no longer be visible in the video data generated by video source 405b. Similarly, when modular assembly structures 410 interfere with Wi-Fi signals generated by Wi-Fi data source 405a, the items of interest will no longer be included in the Wi-Fi data.

The aircraft assembly plant of FIG. 4 is particularly susceptible to these problems due to the complexity of the materials used, the complexity of the production flows and the complexity of the physical environment of such an assembly plant. An aircraft assembly plant may include physically connected network nodes 405c in addition to Wi-Fi nodes 405a, as well as laser sensors 425 for tracking and alignment of aircraft 402 and materials and tools 420, all of which will have their own data sets and streams.

By applying a process like that of FIG. 1 or FIG. 2 to an environment like that of FIG. 4, existing sources of data may be leveraged to generate increased fidelity time and motion data for the assembly plant of FIG. 4. For example, energy consumption data from energy consumption data source 405d may be used to locate production tool 420 by locating a source of energy consumption that matches the consumption model for tool 420. As the energy source associated with the energy consumption will be known from energy consumption data source 405e, as will the location of the that energy source, the location of the tool 420 may be determined even when the tool cannot be seen by video data source 405b.

Furthermore, assembly plants, like plant 400 of FIG. 4, often map the progress of their products and the current layout of the plant through plant CAD files. These plant CAD files are produced infrequently, while changes to the assembly and layout of the plant happen often. Due to this, CAD designed physical blueprints may be out of date as soon as they are published. Absent a process like those illustrated in FIGS. 2 and 3, the updating of the plant CAD files may be a manual process that is overly time consuming for updating based on daily operational changes due to the complexity of the ever changing plant environment. On the other hand, by implementing a process like that of FIG. 2 or 3 in a plant 400, the updating of the plant CAD files can take place on a daily or hourly basis, or even in real time.

While described above with reference to an aircraft manufacturing plant, the techniques described herein are flexible and may be applied in a variety of diverse environments. For example, similar techniques may be used in logistics and supply chain implementations, oil rig implementations, environmental monitoring implementations, more generalized human activity tracking, and many other IoE/IoT implementations.

Figure 5:
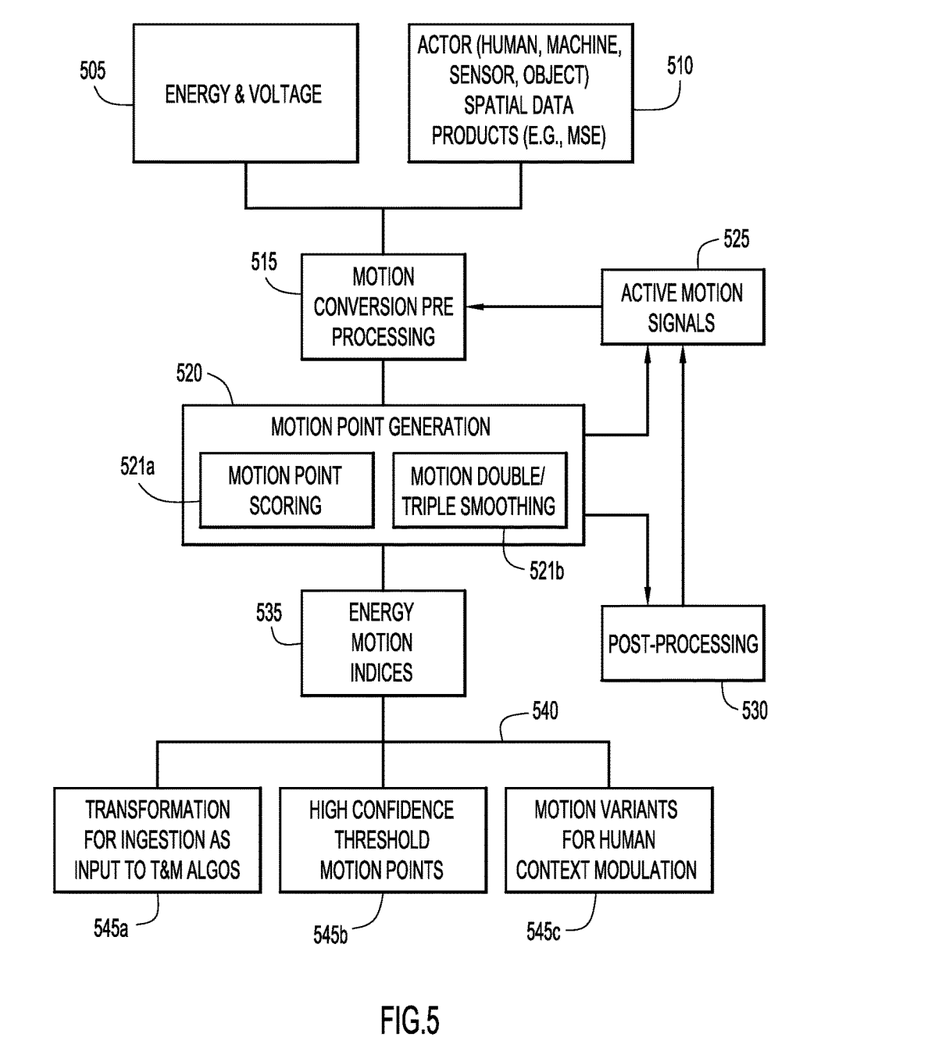
FIG. 5 is a flowchart illustrating a process of converting energy consumption data into motion data, according to an example embodiment.

With reference now made to FIG. 5, depicted therein is a process 500 for converting energy data into location and motion data, as used in the techniques described herein. At 505 energy and voltage data is received from an energy monitoring data source (e.g., Cisco's Energy Manager™). At 510, real-time spatial and/or location data of an actor associated with the energy usage is received. The real-time location is determined through, for example, triangulation data provided by Wi-Fi data. Specifically, using signal strength data at a device from three Wi-Fi access points, the three signal strengths may be used to approximate the real-time location of the Wi-Fi enabled device. This location data may be used to increase the fidelity of the location data derived from the energy usage data received in 505 (i.e., data preconfigured in Cisco's Energy Manager™ or derived from an identity management system, such as Microsoft's Active Directory™). In operation 515, pre-processing is performed on the data acquired in operations 505 and 510. Specifically, the data received in operation 505 is merged with the data received in operation 510, based on the specific energy sensors from which the energy consumption data was received. The data is also merged based on the time intervals over which the data was received.

In operation 520, the merged data is processed to determine from the energy consumption data that a change in location has taken place. More specifically, the detected change in location serves as an indication that the source of the energy consumption has moved from one location to another. Motion point scoring takes place in operation 521a and motion smoothing takes place in operation 521b.

The motion scoring may calculate motion (i.e., change in location) using the following formula:

$$m_x(t) = \frac{m_x(\Delta u_x \mid e_x) \cdot m_x(u_x)}{m_x(\Delta u_x \mid e_x)};$$

wherein x is the spatial data, t is the timestamp in certain data series, $u_x(t)$ is the motion unit index for a location x at a timestamp t, $e_x(t)$ is energy pre-processing that converts energy into a motion mask and classifies a point as one of "motion," "no motion" or "potential motion," and $m_x(t)$ is the calculated or accepted determination of whether or not motion has taken place.

The motion smoothing operation of 521b similarly calculates motion using the following formula:

$$m_x(t) = (s_t - nb_t)c_{t-L+1+(n-1) \bmod L};$$

wherein $c_t$ is a correction factor; $b_t$ is a best estimate, L is a length; and n is a numeric for t plus the next time interval.

By using both of the formulas above to independently detect motion, their outputs may be used as training factors to improve the individual algorithms. Furthermore, the derived combined output of the formulas may provide higher levels of confidence in the energy data to motion conversion, may allow for forecasting propensity for motion, and may provide for pattern abstraction and masking.

In operation 525, the identified motion is fed back into the pre-processing step 515. Specifically, as part of the pre-processing step a library comprised of previously identified signal patterns, which have been inserted into the library as rapid mathematical filters for energy motion, may be utilized. Additional library entries may be inserted in operation 525 based on the motion detection that takes place in operation 520.

In operation 530, post-processing is performed to allow machine learning to continuously identify improvements that can be made to the motion identification process of 520. The post-processing of 530 may also feed into operation 525 if new signal patterns are identified that may be included in the library.

In operation 535, motion point indices are derived from the motion detecting algorithms of operation 520. These indices are used to determine whether a new motion signal has been detected. Finally, in operation 540, outputs from the motion detection process are provided. These outputs include derived data 545a for input to time and motion algorithms, high confidence points 545b that are reported as detected motion, and potential motion points 545c that may be presented to a user to accept, dismiss or further process to determine if they represent actual motion.

Figure 6:
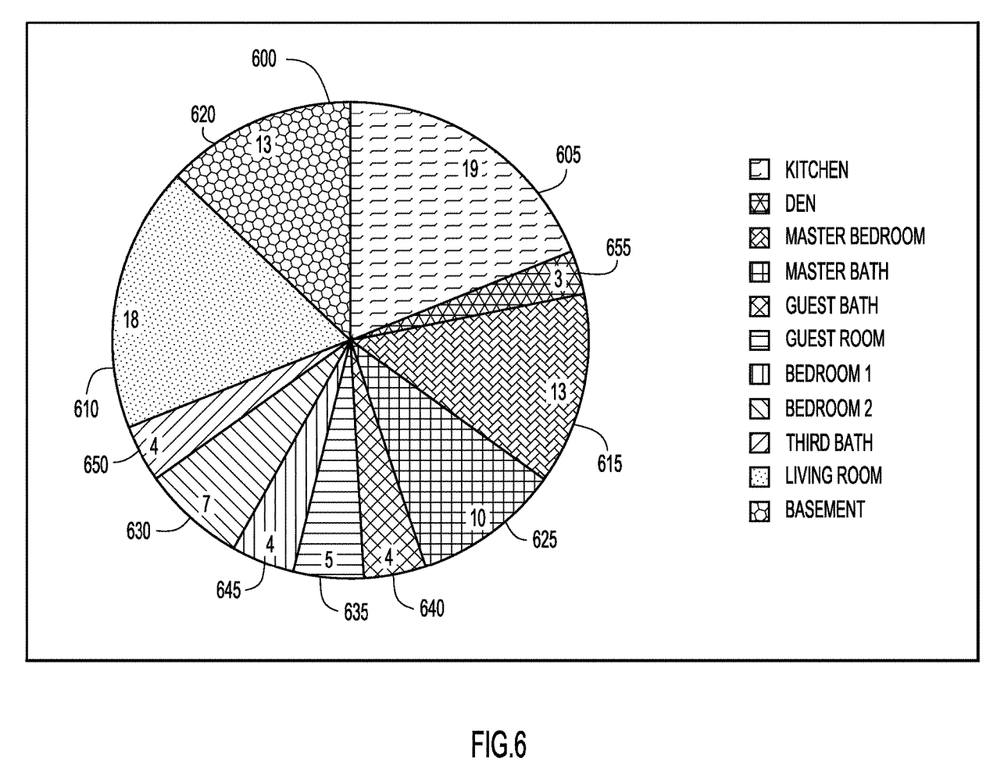
FIG. 6 is a pie chart combining energy consumption data with location data that is used to analyze presence, according to an example embodiment.

With reference now made to FIG. 6, depicted therein is a pie chart 600 illustrating how the techniques described herein may be used to track human space utilizations. According to the particular example of FIG. 6, the energy usage data is implemented in a real estate application that efficiently identifies where potential buyers spend their time as they view a home. This data may be used to maximize the sale price of the home. The real estate application determines which rooms should be staged the most carefully (or remodeled) without necessarily installing video cameras in all rooms of the home during, for example, an open house or when potential buyers are viewing a property with their agent.

As illustrated, energy usage data, i.e., the energy consumed by the lights in a home, is combined with location data indicating where each energy source is located. This energy consumption data combined with the location data is graphed in pie chart 600. According to the example of FIG. 6, portions 605, 610, 615 and 620, corresponding to the kitchen, the living room, the master bedroom, and the basement, respectively, have the most energy utilization during viewings of the home. Accordingly, a determination may be made that these are the portions of the home most viewed by potential buyers, and therefore, should be the areas of the home most carefully staged. The energy data displayed in FIG. 6 may be supplemented by inexpensive motion sensors to measure activity in a given room.

The energy usage mapping illustrated in FIG. 6 may also be applied to other environments, such as a factory floor or a retail store in order to determine the most heavily used areas of these structures. When the energy usage signature is correlated with information identifying how different items utilize energy, items may be tracked throughout a house or a manufacturing environment without having to rely on expensive active RFID. As the devices are tracked, their locations may be added to a plant CAD, as described above with reference to FIGS. 3 and 4.

With reference now made to FIG. 7, depicted therein is another example of combining energy data with location data to track human presence and/or space utilization. Illustrated in FIG. 7 is location data that maps an office environment 700. Overlaid with the location data is energy usage data. Areas with dark, left-to-right shading indicate areas with high energy usage, areas with dark, right-to-left shading indicate areas of medium energy usage, and areas with light shading indicate areas of light energy usage. Areas without shading indicate locations within the office environment 700 in which there is no energy usage.

Based on the combined energy and location data, it may be determined which areas of an office are occupied, and which areas are vacant. For example, area 715 with its high concentration of high energy usage is most likely occupied. Area 720, on the other hand, with practically no energy usage is likely empty, while area 725 likely has an occupancy somewhere between that of area 715 and 720. In other words, FIG. 7 illustrates determining physical presence based on energy usage. Furthermore, the data in FIG. 7 may be further correlated and combined with badge-swipe data, i.e., data derived from when an employee swipes his or her badge to enter an office location, to improve the fidelity of the mapping 700.

Based on these usage determinations, reservation decisions may be made. For example, a conference room located near area 715 may be automatically reserved for the employees located there, as the high occupancy suggests that it is likely that a conference room will be needed by those employees.

Accordingly, the techniques as described above with reference to FIGS. 6 and 7 allow energy usage to be used to map occupancy and utilization of physical resources based on energy data. In other words, the techniques illustrated in FIGS. 6 and 7 automate the transformation of energy data into time and motion data. This allows for the automation of time-and-motion studies, and therefore, allows for the automation of time and motion consulting, turning consulting into a digital enterprise. Furthermore, the techniques described in conjunction with FIGS. 6 and 7 are applicable to buildings, factory floors, fulfillment centers, retail stores, and many other structures where space utilization may be tracked.

Figure 8:
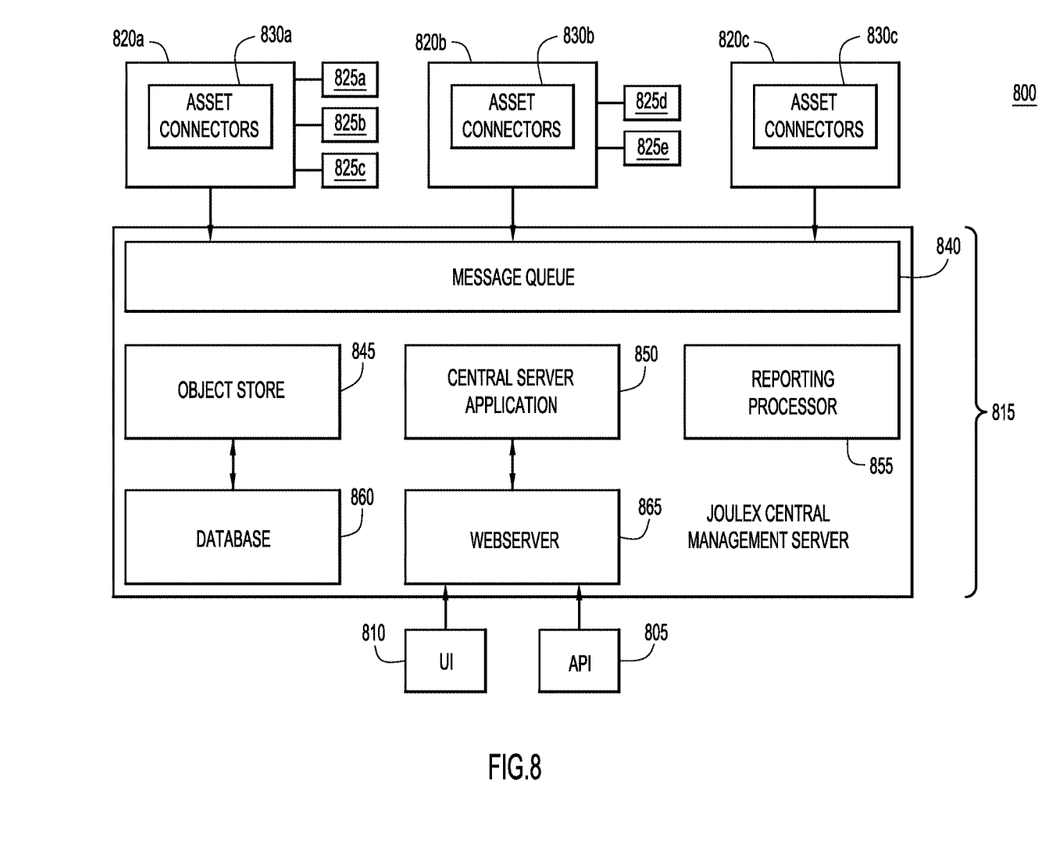
FIG. 8 is a block diagram illustrating a system configured to generate high fidelity data sets for display to and analysis by a user, according to an example embodiment.

With reference now made to FIG. 8, depicted therein is a system 800 for providing energy data and/or time and motion data to a user. Specifically, an application program interface (API) 805 provides energy data and/or time and motion data to a user through user interface 810 to plot a business process in time, as well as in space. System 800 includes two main components, central manager 815, which may be housed in a data center or a private cloud, and the local site controllers/collectors 820a-c. The controllers/collectors 820a-c provide the ability to interrogate various assets 825a-e using connectors 830a-c. The connectors allow central manager 815 to acquire data as well as manage industrial assets, such as voice over internet protocol (VoIP) phones 825a, printers 825b, personal computer (PC) 825c, and others. The acquired data is then moved into message queue 840 that delivers the data to the central manager 815. Once received at central manager 815, the elements of central manager 815 (object store 845, central server application 850, reporting processor 855, database 860 and webserver 865) interact to provide the energy data to API 805 for display to the user through user interface 810. In other words, system 800 may be used to deliver displays such as those illustrated in FIGS. 6 and 7 of the present application, allowing a user to make determinations based on combined and correlated data sets, including energy data and/or time and motion data.

Central manager 815 may provide three different methods for measuring energy usage: Static, Dynamic, and Active. The static method addresses energy usage on non-personal computer (PC) legacy devices such as printer 825b or a monitor, where the energy usage is "looked up" based on the device model or part number and then added into database 860 based on a length of time of use. The dynamic method uses statistical calculations for utilization of legacy PCs or servers. The active method uses "actual" energy usage values reported by the devices themselves. The accuracy of the energy consumption calculations depends on the method used to measure the energy usage, with active generally being the most accurate and static generally being the least accurate. The energy consumption data may also be collected using the central manager 815 regardless of the presence or usage of local collectors 820a-c. The local collectors 820a-c are used for collecting data from multiple assets and aggregating it for transmission to central manager 815. The energy consumption data from assets 825a-e may also be sent directly to central manager 815. Accordingly, regardless of the topology, the data ends up at object-store 845 of central manger 815 and is available for other software tools that communicate or interact with API 805.

System 800 may be used to determine time and motion data from energy usage data, such as using the actual power drawn by VOIP phone 825a to determined the time and nature of a VOIP call. For example, assuming VOIP phone 825a is a phone used by a call center servicing a manufacturing shop floor, the energy usage of VOIP phone 825a, in conjunction with other datasets, may be used to determine the type of issue being experienced in the manufacturing shop.

For example, a first data set, data set 1, indicates that a shop machine went offline at time "T." A second data set, data set 2, provides data about the function that the machine was performing prior to the machine going offline. In other words, data set 2 provides information about what the machine was doing at time "T−x," where x is a random duration of operation prior to the outage. Using information from central manager 815, the time a call was placed to VOIP phone 825a may be determined. This data set stored in central manager 815 is data set 3. Time and motion data from a surveillance system on the shot floor may be used to determine movement of support personnel between time "T−x" and time "T+y," wherein y is the time duration after "T" when the shop machine was restored or repaired. Based on the times T and T+y, and data set 1, data set 2 and data set 3, various determinations may be made using correlation among the various elements, such as:

Time and motion studies of the process that took place between the detection of outage up until the repair; and Data sets from various outages and time periods may be combined to calculate a mean time to repair (MTTR), which can be correlated to build a more accurate MTTR value and thereby better predict accurate wait times and outage times for a customer.

Other uses of system 800 may be to study overall equipment effectiveness (OEE). OEE measurements may be based on three factors—availability of equipment, performance of equipment, and quality of the performance. Performance takes into account "speed loss." Speed loss is one possible target of time and motion studies. Correlating productivity speed loss with energy consumption, and other various process elements may provide meaningful business insights. For example, an observed increase in energy-consumption while all other factors remain constant may allow for a prediction of a pending maintenance issue on a device. For example, in certain mechanical devices an increase in energy consumption may indicate a mechanical problem with a device. A conveyor belt may require additional energy to maintain a required speed when it lacks sufficient oil or lubrication. Accordingly, an increase in energy consumption by such a mechanical device may be correlated with an impending mechanical failure.

Figure 9:
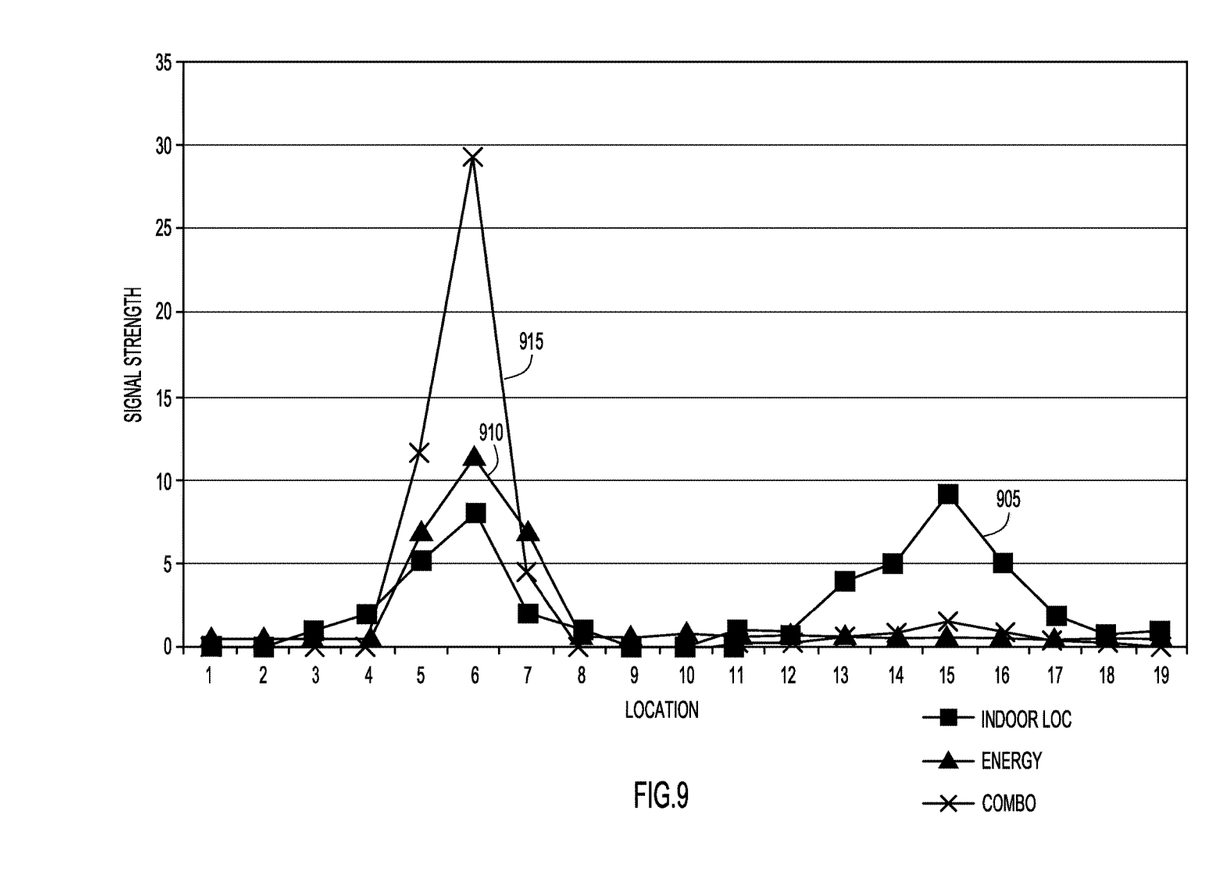
FIG. 9 is a graph illustrating the use of energy data to modulate a time and motion data set, according to an example embodiment.

With reference now made to FIG. 9, depicted therein is an example of a display screen generated by, for example, system 800 of FIG. 8, in which energy usage data is used to modulate other data. As illustrated in FIG. 9, energy usage data is constructively or destructively combined with other data in order to scale or reinforce the predictive ability of other data sets, or to determine how a particular location is being used, not just that a location is in use.

Illustrated in FIG. 9 are three plots. According to the example of FIG. 9, plot 905 is a plot of the strength of a motion data set. Specifically, plot 905 indicates that there is motion at locations "6" and "15." Plot 910 graphs the strength of energy consumption data versus location. Finally, plot 915 is a combination of the motion and energy data that illustrates how likely it is that someone is actually working at the locations. In other words, plot 905 combines the data in plot 905 with that of plot 910 to predict presence, i.e., the presence of a person or user.

It may be determined based on historical data sets, that when energy consumption data is of a certain high strength, it positively correlates with motion data to suggest that an individual is working at a particular location. On the other hand, when energy consumption at a location is below a certain strength it is negatively correlated with motion data to suggest that an individual is working at a particular location. For example, motion in combination with high energy consumption suggests that someone is working at a location, while motion with low energy consumption indicates a person moving through the location. Taking these correlations into considerations, plot 915 is constructed to strongly suggest that someone is working at location "6." This is because the high energy consumption is positively correlated with the motion data, and therefore, the energy and motion data constructively combine at location "6." Accordingly, plot 915 has a correspondingly high strength at location 6. On the other hand, a low energy consumption strength value is negatively correlated with motion at a particular location, and therefore, the low energy consumption data destructively combines with the motion data at location "15." Plot 915 has a correspondingly low value at location "15," and therefore it is unlikely that there is someone working at location 15.

Figure 10:
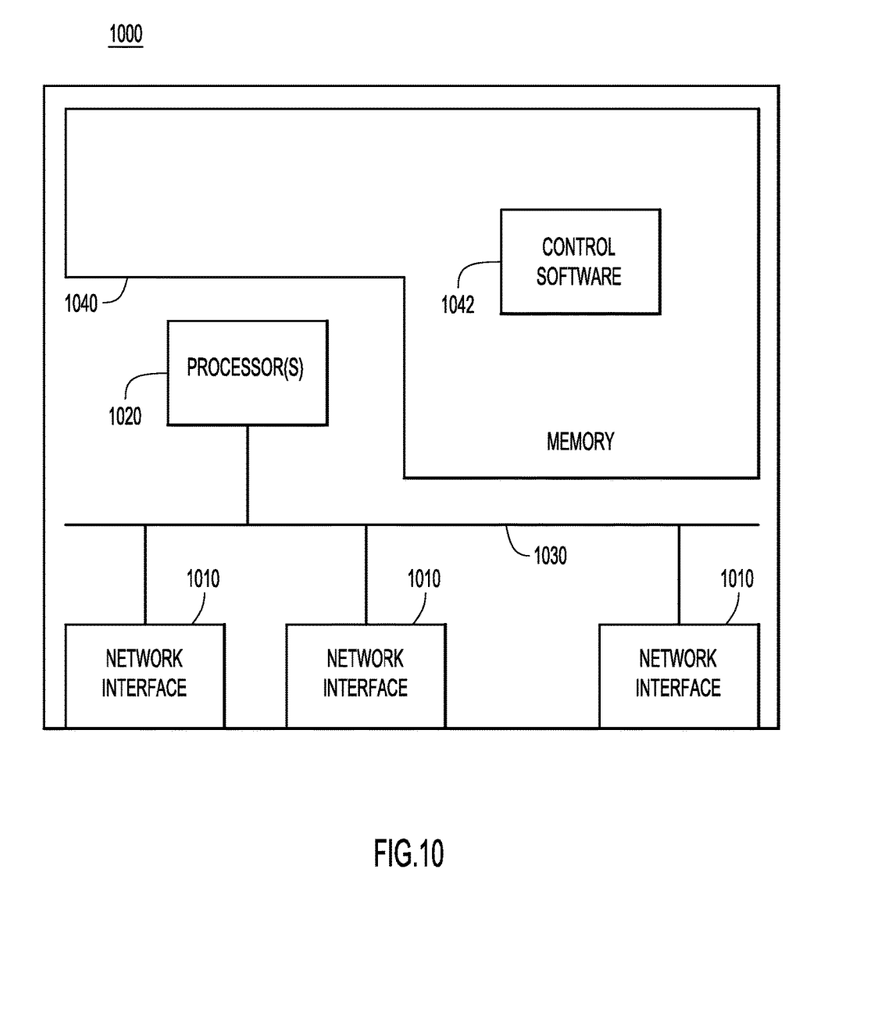
FIG. 10 is a block diagram of a device configured to combine time and motion data to generate high fidelity data sets, according to an example embodiment.

With reference now made to FIG. 10, an example block diagram is shown of a device 1000 that may be any one of the devices described above with reference to FIGS. 1-9. Accordingly, device 900 is configured to perform the techniques described herein. Device 1000 includes network interfaces (e.g., network ports) 1010 which may be used to receive and send packets over a network. The network interfaces 1010 may be included as part of a network interface unit (e.g., a network interface card). Accordingly, network interfaces 1010 may be embodied as wired interfaces, wireless interfaces, optical interfaces, electrical interfaces, or a combination thereof. One or more processors 1020 are provided to coordinate and control device 1000. The processor 1020 is, for example, one or more microprocessors or microcontrollers, and it communicates with the network interfaces 1010 via bus 1030. Memory 1040 stores software instructions 1042 which may be executed by the processor 1020. For example, control software 1042 for device 1000 includes instructions for performing the fusion of time and motion data sets to generate higher fidelity data sets described above with reference to FIGS. 1-9. In other words, memory 1040 includes instructions for device 1000 to carry out the operations described above in connection with FIGS. 1-9. Memory 1040 may also store the data sent from data sources described above with reference to FIGS. 1-9. This data may be stored in a database in memory 1040, and control software 1042 may allow the processor 1020 to access the data.

Memory 1040 may include read only memory (ROM), random access memory (RAM), magnetic disk storage media devices, optical storage media devices, flash memory devices, electrical, optical or other physical/tangible (e.g. non-transitory) memory storage devices. Thus, in general, the memory 1040 may be or include one or more tangible (non-transitory) computer readable storage media (e.g., a memory device) encoded with software comprising computer executable instructions. When the instructions of the control software 1042 are executed (by the processor 1020), the processor is operable to perform the operations described herein in connection with FIGS. 1-9.

In summary, described herein are methods that compile a plurality of data sets in a memory. A first data set comprises a location mapping of an item of interest within a predetermined environment, and a second data set comprises energy usage data within the predetermined environment. The first data set is correlated, via a processor, with the second data set to locate a subset of energy usage data in the second data set associated with the item of interest. A third data set is generated by combining the first data set with the subset of energy usage data in the second data set to increase an accuracy of the location mapping of the item of interest based upon the subset of energy usage data. The third data set is applied to a computing resource. According to specific embodiments, the computing resource may be a CAD model of a manufacturing environment in which updates are made to the location of items being manufactured and/or the locations of the tools or materials used in the manufacturing process. According to other example embodiments, the computing resource may be a mapping of an environment, such as an office or home environment, in which the presence of individuals is mapped and updated based on the third data set.

As also described herein are apparatuses, as described in FIG. 10, that are configured to compile a plurality of data sets in the memory of the apparatus. A first data set comprises a location mapping of an item of interest within a predetermined environment, and a second data set comprises energy usage data within the predetermined environment. The first data set is correlated, via the processor of the apparatus, with the second data set to locate a subset of energy usage data in the second data set associated with the item of interest. A third data set is generated by combining the first data set with the subset of energy usage data in the second data set to increase an accuracy of the location mapping of the item of interest based upon the subset of energy usage data. The third data set is applied to a computing resource. As with the method embodiments described herein, the computing resource may be a CAD model of a manufacturing environment in which updates are made to the location of items being manufactured and/or the locations of the tools or materials used in the manufacturing process. The computing resource may also be a mapping of an environment, such as an office or home environment, in which the presence of individuals is mapped and updated based on the third data set.

Finally, described herein are computer readable media, encoded with instructions that when executed by a processor cause the processor to carry out the operations as described herein. Specifically, the processor is caused to compile a plurality of data sets in a memory. A first data set comprises a location mapping of an item of interest within a predetermined environment, and a second data set comprises energy usage data within the predetermined environment. The instructions cause the processor to correlate the first data set with the second data set to locate a subset of energy usage data in the second data set associated with the item of interest. The instructions further cause the processor generate a third data set by combining the first data set with the subset of energy usage data in the second data set to increase an accuracy of the location mapping of the item of interest based upon the subset of energy usage data. The third data set is applied to a computing resource. As with the method and apparatus embodiments described herein, the computing resource may be a CAD model of a manufacturing environment in which updates are made to the location of items being manufactured and/or the locations of the tools or materials used in the manufacturing process. The computing resource may also be a mapping of an environment, such as an office or home environment, in which the presence of individuals is mapped and updated based on the third data set.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   acquiring, via a processor, a plurality of data sets from a plurality of data sources, wherein a first data set is acquired from a first data source and a second data source, the first data source being a video motion capture device, the second data source being at least one network node, and comprises a location mapping of an item of interest within a predetermined environment that is derived from video motion data and network traffic data, the item of interest being one of a plurality of items of interest within the predetermined environment, and wherein a second data set is acquired from a third data source and comprises energy usage data for the plurality of items of interest within the predetermined environment;
   compiling, in a memory, the plurality of data sets;
   correlating, via the processor, the first data set with the second data set to locate a subset of energy usage data in the second data set associated with the item of interest;
   generating, via the processor, a third data set by combining the first data set with the subset of energy usage data in the second data set to increase an accuracy of the location mapping of the item of interest based upon the subset of energy usage data; and
   applying the third data set to a computing resource.

2. The method of claim 1, wherein applying the third data set to the computing resource comprises updating a computer aided design model of the predetermined environment.

3. The method of claim 2, wherein the predetermined environment comprises a manufacturing environment, wherein the item of interest is a product being manufactured, and wherein updating the computer aided design model comprises updating a location of the product being manufactured in the computer aided design model.

4. The method of claim 1, wherein applying the third data set to the computing resource comprises generating visual graphs illustrating the energy usage data of the plurality of items of interest at particular locations within the predetermined environment.

5. The method of claim 1, wherein applying the third data set to the computing resource comprises reserving resources for the item of interest in an electronic reservation system.

6. The method of claim 1, further comprising predicting a future location of the item of interest within the predetermined environment and adding the future location to the location mapping,
   wherein applying the third data set to the computing resource comprises providing the future location to the computing resource.

7. The method of claim 6, further comprising tracking motion of the item of interest based upon the location mapping and the future location of the item of interest.

8. The method of claim 1, wherein combining the first data set with the subset of energy usage data in the second data set further comprises tracking a location of the item of interest in a predetermined location based on the subset of energy usage data.

9. The method of claim 1, wherein the first data set further comprises Wi-Fi location data.

10. The method of claim 1, wherein combining the first data set with the subset of energy usage data comprises combining the first data set with the subset of energy usage data with a fourth data set, wherein the fourth data set comprises Wi-Fi location data.

11. An apparatus comprising:
    a memory; and
    a processor, wherein the processor is configured to:
    acquire a plurality of data sets from a plurality of data sources, wherein a first data set is acquired from a first data source and a second data source, the first data source being a video motion capture device, the second data source being at least one network node, and comprises a location mapping of an item of interest within a predetermined environment that is derived from video motion data and network traffic data, the item of interest being one of a plurality of items of interest within the predetermined environment, and wherein a second data set is acquired from a third data source and comprises energy usage data for the plurality of items of interest within the predetermined environment;

compile, in the memory, the plurality of data sets;

correlate the first data set with the second data set to locate a subset of energy usage data in the second data set associated with the item of interest;

generate a third data set by combining the first data set with the subset of energy usage data in the second data set to increase an accuracy of the location mapping of the item of interest based upon the subset of energy usage data; and apply the third data set to a computing resource.

12. The apparatus of claim 11, wherein the processor is configured to apply the third data set to the computing resource by updating a computer aided design model of the predetermined environment.

13. The apparatus of claim 12, wherein the predetermined environment comprises a manufacturing environment, and wherein the processor is configured to update the computer aided design model of the predetermined environment by updating the computer aided design model of the manufacturing environment to indicate a location of a product being manufactured.

14. The apparatus of claim 11, wherein the processor is configured to apply the third data set to the computing resource by generating visual graphs illustrating the energy usage data of the plurality of items of interest at particular locations within the predetermined environment.

15. The apparatus of claim 11, wherein the processor is configured to apply the third data set to the computing resource by reserving resources for the item of interest in an electronic reservation system.

16. A tangible, non-transitory computer readable media encoded with instructions, wherein the instructions, when executed by a processor, cause the processor to:

acquire a plurality of data sets from a plurality of data sources, wherein a first data set is acquired from a first data source and a second data source, the first data source being a video motion capture device, the second data source being at least one network node, and comprises a location mapping of an item of interest within a predetermined environment that is derived from video motion data and network traffic data, the item of interest being one of a plurality of items of interest within the predetermined environment, and wherein a second data set is acquired from a third data source and comprises energy usage data for the plurality of items of interest within the predetermined environment;

compile, in a memory, the plurality of data sets;

correlate the first data set with the second data set to locate a subset of energy usage data in the second data set associated with the item of interest;

generate a third data set by combining the first data set with the subset of energy usage data in the second data set to increase an accuracy of the location mapping of the item of interest based upon the subset of energy usage data; and apply the third data set to a computing resource.

17. The computer readable media of claim 16, further comprising instructions that cause the processor to apply the third data set to the computing resource by updating a computer aided design model of the predetermined environment.

18. The computer readable media of claim 17, wherein the predetermined environment comprises a manufacturing environment, and further comprising instructions that cause the processor to update the computer aided design model of the predetermined environment by updating the computer aided design model of the manufacturing environment to indicate a location of a product being manufactured.

19. The computer readable media of claim 16, further comprising instructions that cause the processor to apply the third data set to the computing resource by generating visual graphs illustrating the energy usage data of the plurality of items of interest at particular locations within the predetermined environment.

20. The computer readable media of claim 16, further comprising instructions that cause the processor to apply the third data set to the computing resource by reserving resources for the item of interest in an electronic reservation system.

* * * * *